United States Patent [19]

Isono et al.

[11] Patent Number: 4,837,761
[45] Date of Patent: Jun. 6, 1989

[54] HEADER DRIVEN TYPE PACKET SWITCHING SYSTEM

[75] Inventors: Osamu Isono; Toshimasa Fukui; Tetsuo Nishino; Tetsuo Tachibana, all of Kawasaki; Eisuke Iwabuchi, Yokohama, all of Japan

[73] Assignee: Fujitsu Limited, Kawasaki, Japan

[21] Appl. No.: 198,089

[22] Filed: May 24, 1988

[30] Foreign Application Priority Data

May 26, 1987 [JP] Japan .................. 62-129471

[51] Int. Cl.$^4$ .............................. H04J 3/24
[52] U.S. Cl. ..................................... 370/60
[58] Field of Search ............... 370/60, 94, 110.1

[56] References Cited

U.S. PATENT DOCUMENTS

| 4,596,010 | 6/1986 | Beckner et al. | 370/60 |
| 4,692,917 | 9/1987 | Fujioka | 370/60 |
| 4,755,986 | 7/1988 | Hirata | 370/94 |
| 4,761,778 | 8/1988 | Nara et al. | 370/60 |

FOREIGN PATENT DOCUMENTS 61-256847 12/1985 Japan .
62-98842 3/1986 Japan .

*Primary Examiner*—Douglas W. Olms
*Assistant Examiner*—Min Jung
*Attorney, Agent, or Firm*—Staas & Halsey

[57] ABSTRACT

In a header driven type packet switching system, all incoming and outgoing lines required for the system are divided into groups to constitute a two stage structure of incoming and outgoing modules, which are prepared for the respective incoming and outgoing line groups. In each incoming module, outgoing module and outgoing line, information is given to packets, and the data packets are successively transferred from the outgoing modules to the corresponding outgoing lines. Thus, the system can flexibly cope with an increase of the incoming lines and the number of calls.

4 Claims, 6 Drawing Sheets

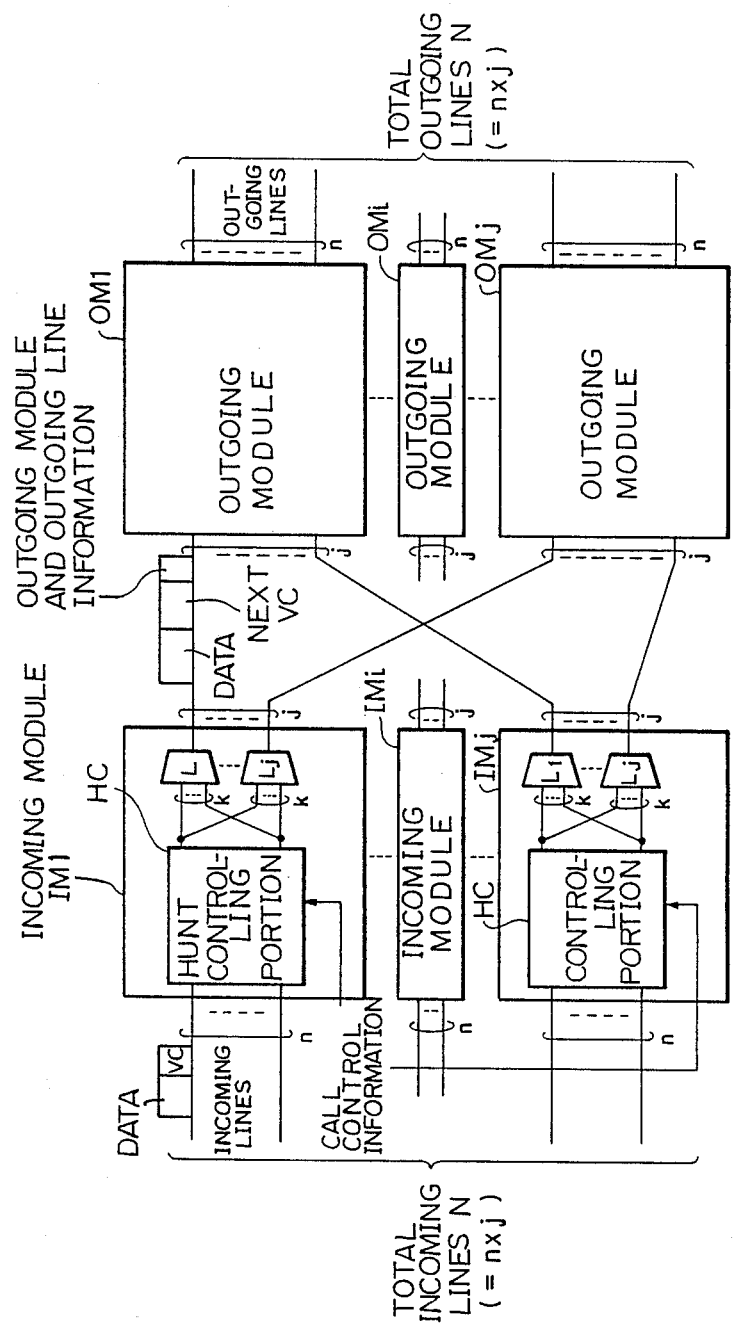
Fig. 1 PRINCIPLE VIEW OF HEADER DRIVEN TYPE PACKET SWITCHING SYSTEM ACCORDING TO PRESENT INVENTION

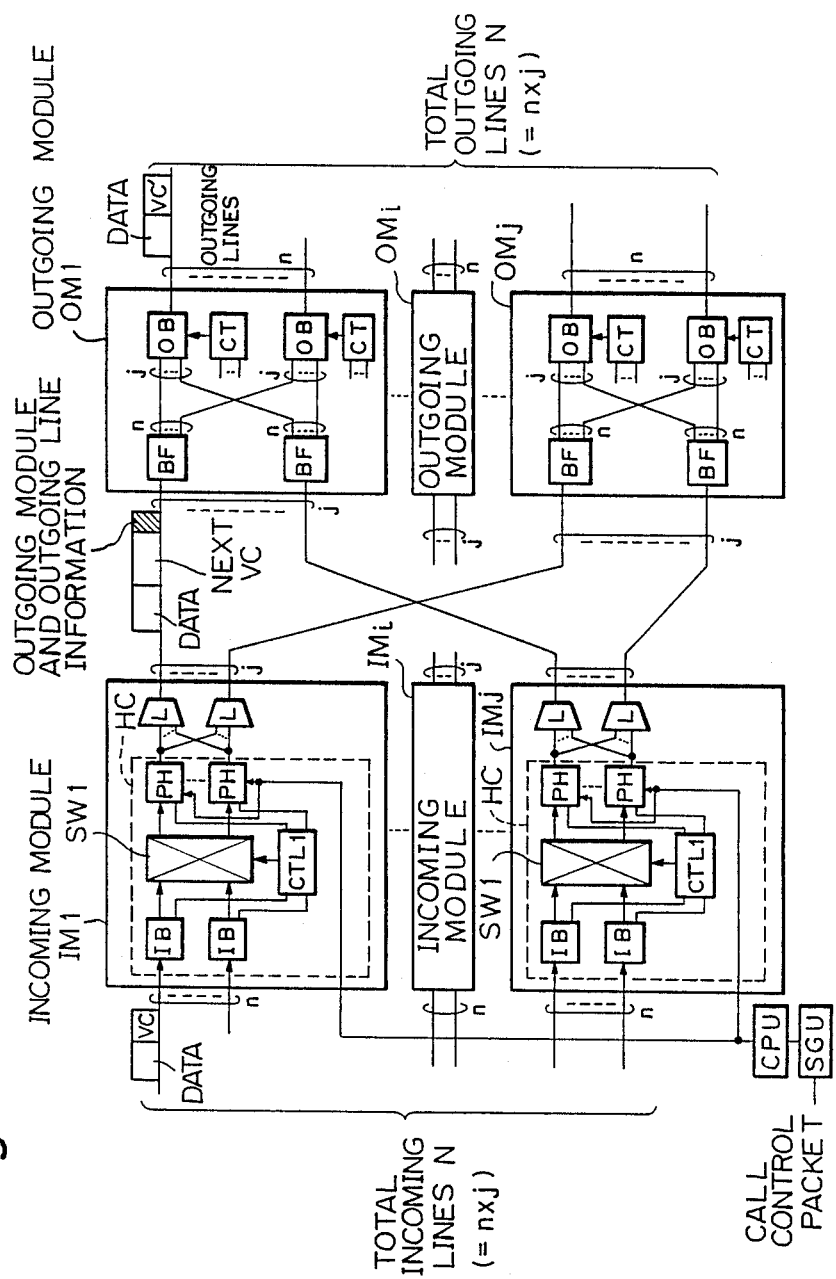
Fig. 2 EMBODIMENT OF PRESENT INVENTION

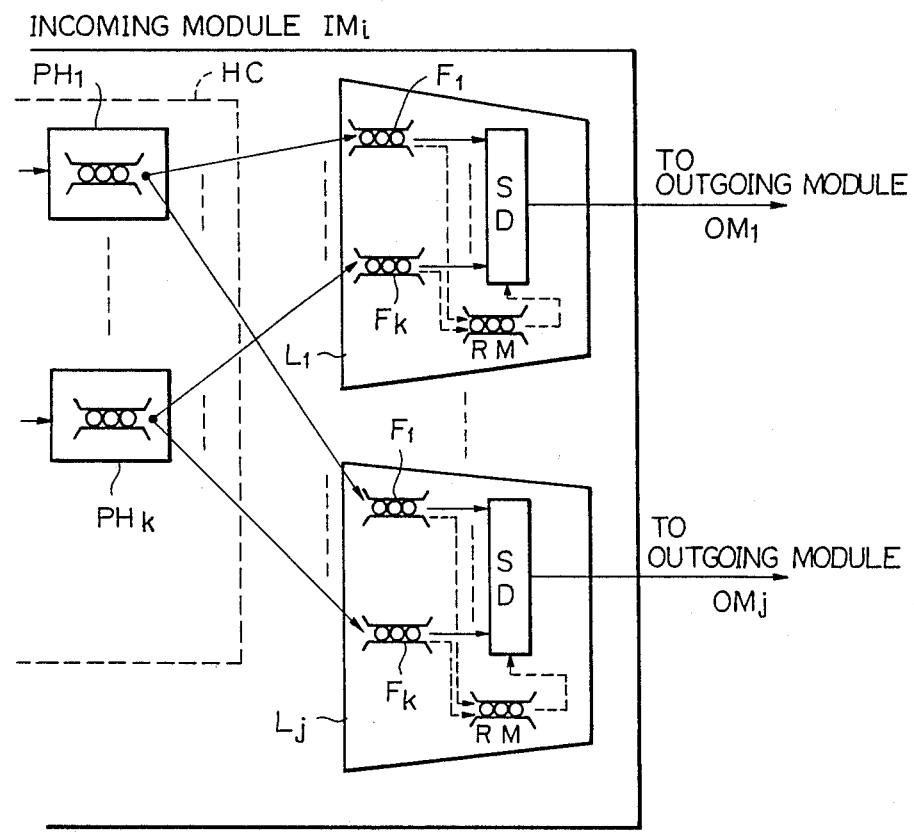
Fig. 3 CONSTITUTION OF LINKING PORTION IN INCOMING MODULE

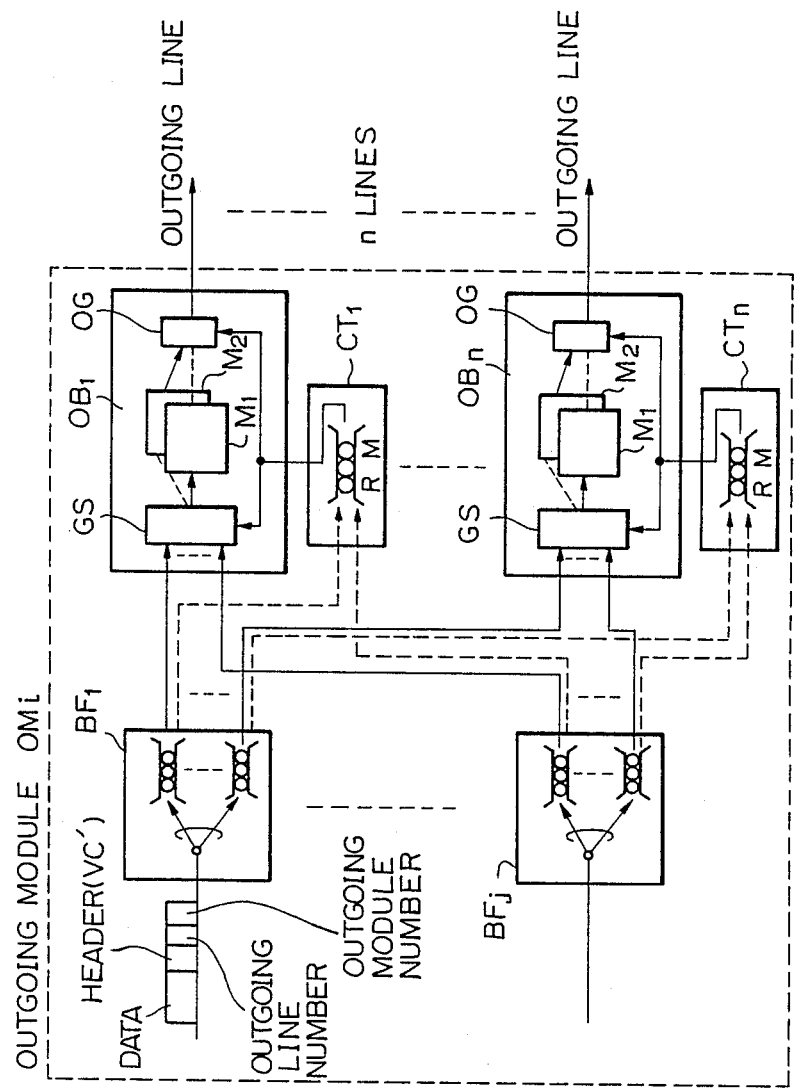
Fig. 4 CONSTITUTION OF OUTGOING MODULE

ROUTING HEADER CONVERSION TABLE IN THE SYSTEM SHOWN IN Fig. 6

ROUTING HEADER CONVERSION TABLE OF PRESENT INVENTION

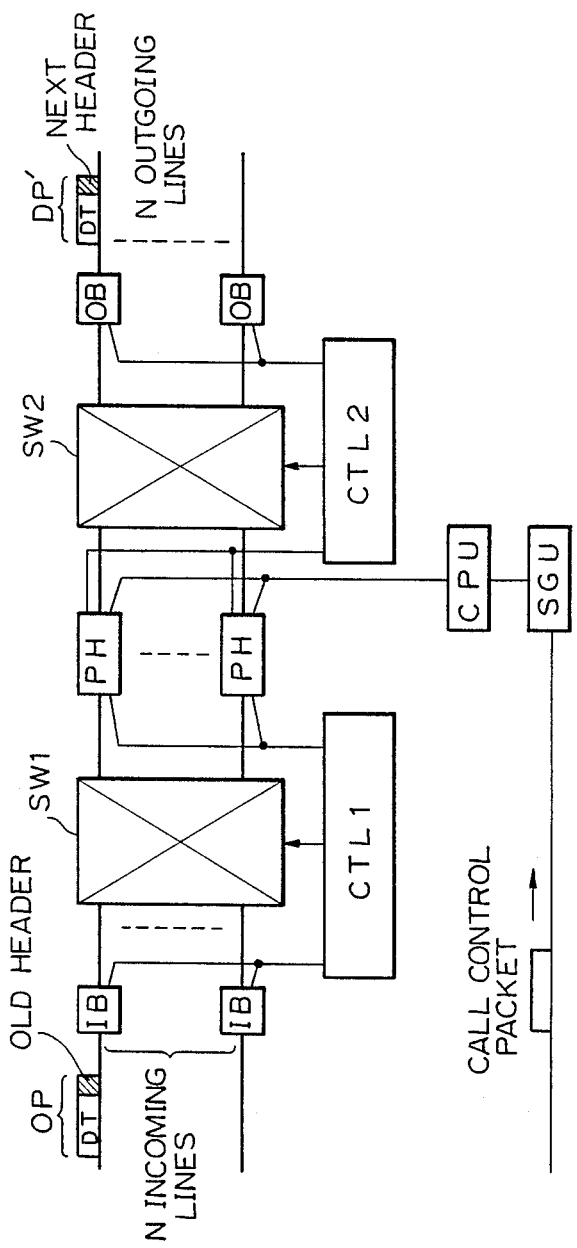
Fig. 6 SYSTEM PROVIDED BEFORE INVENTION

HEADER DRIVEN TYPE PACKET SWITCHING SYSTEM

BACKGROUND OF THE INVENTION

1. Field of the Invention

The present invention relates to a packet switching system, particularly to a header driven type packet switching system adapted for a high-speed packet switching node (non-x.25 protocol base) in an ISDN (integrated services digital network) and in a packet network.

To cope with recent high-speed communications, there is an increasing demand for packet type digital data communications, and therefore, a header driven type packet switching system which exchanges packets according to packet headers by hardware autonomous line switches, has been put to practical use to improve the packet switching processing capacity and processing speed.

2. Description of the Related Art

The basic functions required for the header driven type packet switching system are a routing function, for decoding the header of an input packet for transfer to a destination, and a function for rewriting the header with the virtual call number of a selected line.

Such a prior art header driven type packet switching system is disclosed, for example, in Japanese Unexamined Patent Publication No. 61-127250.

In a conventional header driven type packet switching, header processing circuits, each of which decodes the header of an input packet, rewrites the information in the header, and transmits a control signal to a switching portion to select an outgoing line for the packet, are provided only in a fixed correspondence with incoming lines of the switching system.

Therefore, when a plurality of packets are continuously transmitted through a particular incoming line, the first packet must be completely processed before the next packet can be processed, and thus the processing of the following packets may be greatly delayed, or those packets may have to be dropped.

To solve the above problems in the prior art, the inventors of the present invention presented, prior to the present invention, a new header driven packet switching system and method in which, by providing header processing circuits arranged independently of the incoming lines, successive data packets can be efficiently and flexibly processed without overlong delay, which was filed as Japanese patent application Ser. No. 62-36736, on Feb. 19, 1987.

The above-mentioned preceding system (herein after referred to as the preceding system) will be later described in more detail with reference to the drawings.

The above-mentioned preceding header driven type packet switching system can achieve a hardware autonomous control without software for the switches for each packet, to realize a packet switching process which can cope with a large scale data packet. Nevertheless, this system has the following drawbacks:

① the processing speed of LSIs used in the packet processing circuits and in the switching mechanisms are limited when the number of incoming and outgoing lines is increased; and ② when a transmission capacity (incoming lines and the number of calls are increased, a capacity of the memory for holding the next virtual call number and the outgoing line number in each packet header processing circuit PH must be increased.

SUMMARY OF THE INVENTION

Therefore, an object of the present invention is to realize a header driven type packet switching system which can cope with an increased transmission capacity while maintaining the line noncorrespondent hunting of the above-mentioned packet header processing circuits.

To attain the above object, there is provided, according to the present invention, a header driven type packet switching system for switching from N incoming lines to N outgoing lines. The system comprises j incoming modules each accommodating a group of n incoming lines which are derived from the N incoming lines by dividing the N incoming lines into j groups; j outgoing modules each being connected to the j incoming modules through transfer lines, each of the j outgoing modules being connected to n outgoing lines which are derived from the N outgoing lines by dividing the N outgoing lines into j groups; each of the j incoming modulus comprising: a plurality of packet header processing circuits disposed independently of the n incoming lines, for rewriting outgoing line information, outgoing module information and header information in the header of the incoming packet; a hunt control portion for hunting a free circuit from among the packet header processing circuits; and linking portions disposed to be corresponding to all of the outgoing modules, for transferring packets from the hunt controlling portion to the corresponding outgoing modules in the sequence of transfer requests.

BRIEF DESCRIPTION OF THE DRAWINGS

The above object and features of the present invention will be more apparent from the following description of the preferred embodiments with reference to the accompanying drawings, wherein:

FIG. 1 is a block diagram showing the principle of a header driven type packet switching system according to the present invention;

FIG. 2 is a block diagram showing an embodiment of the header driven type packet switching system according to the present invention;

FIG. 3 is a view showing an embodiment of an outgoing portion of an incoming module used for the header driven type packet switching system according to the present invention;

FIG. 4 is a view showing an embodiment of an outgoing module used for the header driven type packet switching system according to the present invention;

FIG. 6 is a view showing the constitution of a header driven type packet switching system provided before the present invention.

DESCRIPTION OF THE PREFERRED EMBODIMENTS

Figure 7:
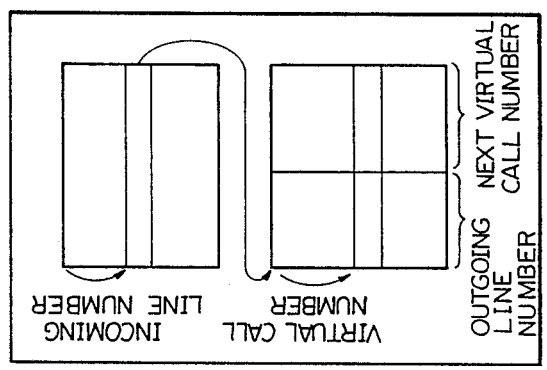
FIG. 7 is a conversion table of routing header information used in the system shown in FIG. 6.

For a better understanding of the embodiment of the present invention, the header driven type packet switching system provided before the present invention will be first described with reference in FIGS. 6 and 7.

FIG. 6 conceptually shows a header driven type packet switching system proposed by the applicant of the present application in Japanese patent application Ser. No. 62-36736 (date of application: Feb. 19, 1987). In the figure, IB represents an input buffer for temporarily storing a data packet DP and connected to a corresponding incoming line, SW1 a switching mechanism to which respective outputs of the input buffers IBs are input, PH a packet header processing circuit arranged to be noncorresponding or independent to the input buffers IBs, that is, the packet header processing circuit PH is arranged to be noncorresponding to the incoming lines through the switching mechanism SW1 to rewrite header information and add data packet routing information related to an outgoing line according to the header information of the data packet DP in the input buffer IB. CTL1 is a controller for controlling the connection of the input buffer IB, which has sent a transfer demand, to a free header processing circuit PH. The controller CTL1 also controls the transfer of the data packet DP. SW2 is a switching mechanism, OB an output buffer, CTL2 a controller for controlling the connection of the packet header processing circuit PH to the output buffer OB which is connected to an outgoing line to which the data packet in the packet header processing circuit PH in question is to be transferred. The controller CTL2 also controls the transfer of a data packet DP'. SGU is a call control packet terminating unit, and CPU a processing unit for setting, for each call, a routing conversion table (refer to FIG. 7) in the packet header processing circuit PH according to a call control packet from the call control packet terminating unit SGU.

The operation of the system shown in FIG. 6 will be described.

The data packet DP from a packet terminating unit (not shown) is passed through an incoming line and stored in an input buffer IB. The data packet DP includes a user data DT as a packet data and a virtual call number VC as packet header information. An incoming line number is added to the data packet in the input buffer IB. The controller CTL1 hunts a free one of the packet header processing circuits PHs, adjusts the competition among transfer demands from the input buffers IBs to select one input buffer, and controls the switching mechanism SW1 to connect the selected input buffer IB to the free packet header processing circuit PH. As a result, the data packet DP provided with the incoming line number is transferred to the hunted packet header processing circuit PH.

In the packet header processing circuit PH to which the data packet has been transferred, the routing conversion table (refer to FIG. 7), which has been already prepared by the processing unit CPU according to a call control packet, is retrieved according to the incoming line number and the virtual call number VC of the arrived data packet DP to find a corresponding outgoing line number and a next virtual call number, write the outgoing line number in a memory, and rewrite the virtual call number to the next virtual call number.

The controller CTL2 controls the switching mechanism SW2 to connect the packet header processing circuit PH to a corresponding outgoing line according to the outgoing line number in the routing information specified in the memory of the packet header processing circuit PH.

By the above-described header driven type packet switching system, a hardware autonomous control is achieved without software for the switches (SW1, SW2) for each packet to realize a packet switching process which can cope with a large scale data packet; but this system has the following drawbacks:

① When the number of incoming and outgoing lines is increased, i.e., when a large transmission capacity is needed, or when a line activity ratio is increased due to an increase in the number of packets to be processed, the controllers CTL1 and CTL2 and the switching mechanism SW1 and SW2, which constitute a connection controlling portion between the input buffers IBs or output buffers OBs and the packet header processing circuits PHs, may cause operational bottleneck troubles due to the operational limits of the hardware (i.e., limits in the processing speeds of the LSI's used).

② Since the packet header processing circuits are provided to be independent of the lines so as to hunt an input data packet in an hunting method, the processing unit CPU sets, for each call, the same routing information in all of the packet header processing circuits PHs through multilple-address communication. But, if a transmission capacity (incoming lines) and the number of calls are increased, the capacity of the memory for holding the next virtual call number and the outgoing line number in each packet header processing circuit PH must be increased.

Now, embodiments of the present invention will be described.

FIG. 1 is a view conceptually showing a header driven type packet switching system according to the present invention. In FIG. 1, the packet switching system according to the present invention accommodates a total of N incoming lines and outputs a total of N outgoing lines. The packet switching system switches from the N incoming lines to the N outgoing lines. The N incoming lines are divided into j groups each consisting of n incoming lines. The j groups of the incoming lines are respectively connected to the inputs of j incoming modules IM1 to IMj. Similarly, the N outgoing lines are divided into j groups each consisting of n outgoing lines. The j groups of the outgoing lines are respectively connected to the outputs of j outgoing modules OM1 to OMj. The outputs of the incoming modules IM1 to IMj are connected to the inputs of the outgoing modules OM1 to OMj. Namely, the system has a two stage constitution.

Each of the incoming modules IM1 to IMj has a hunt controlling portion HC and linking portions L1 to Lj provided to correspond to the respective outgoing modules OM1 to OMj. The hunt controlling portion HC hunts a free header processing circuit PH independently of the incoming line. The free header processing circuit PH is included in the hunt controlling portion HC as shown in FIG. 2. Further, the hunt controlling portion HC rewrites the information of the outgoing line and the outgoing module and the header information. Each of the linking portions L1 to Lj has k inputs connected to the outputs of the hunt controlling portion HC and has an output connected to the input of the corresponding outgoing module, for transferring data from the hunt controlling portion into the outgoing module in a required sequence.

Each of the outgoing modules OM1 to OMj has j inputs, each of which is connected to the output of the corresponding one of the linking portions L1 to Lj in the corresponding incoming modules IM1 to IMj.

Each of the outgoing modules OM1 to OMj transfers a packet to an outgoing line, which has been specified by the header information of the packets, from the hunt controlling portions HCs.

Preferably a transmission capacity of transfer lines between each incoming and outgoing modules is equal to a transmission capacity of n incoming lines of the incoming module.

In the header driven type packet switching system according to the present invention shown in FIG. 1, the required N incoming and outgoing lines in total are divided into j groups each consisting of n lines to constitute two stage modules, i.e., j ($j=N/n$) incoming modules IM1 to IMj and j outgoing modules OM1 to OMj. By this constitution, the processing load in each incoming module and in each outgoing module can be reduced in comparison with the non-divided single controller CTL1 or CTL2 in the preceding system shown in FIG. 6.

In each of the incoming modules IM1 to IMj, the hunt controlling portion HC hunts the packet header processing circuits PH noncorrespondingly to, i.e., independently of lines in the same way as in the preceding system, rewrites the outgoing line information, outgoing module information and header information of a packet, and sends the packet to one of the linking portions L1 to Lj corresponding to the outgoing module in question. The linking portions L1 to Lj are provided to be corresponding to all of the outgoing modules OM1 to OMj so that the input packets cannot be abandoned. The packets in the hunt controlling portion HC are transferred to the same outgoing module in the order of transfer request so that the orders of the packets cannot be disturbed. The one of the outgoing modules OM1 to OMj to which the packet has been transferred transfers the packet to an outgoing line, which is specified by the header information of the packet, from the hunt controlling portion HC.

The transmission lines between the incoming and outgoing modules have a transmission capacity equal to a transmission capacity of the n incoming lines, and therefore, a packet transmission will be realized without internal blocking, that is, without abandoning packets due to a buffer-busy state in the packet switching system (between the incoming and outgoing modules).

An embodiment of the header driven type packet switching system according to the present invention will be described.

FIG. 2 shows the embodiment of the header driven type packet switching system of the present invention shown in FIG. 1. In this embodiment, the hunt controlling portion HC in each of the incoming modules IM1 to IMj shown in FIG. 1 includes, as in the preceding header driven type packet switching system shown in FIG. 6, input buffers IB, a controller CTL1, a switching mechanism SW1, and packet header processing circuits PHs. But, according to the present invention, the functions of the controller CTL2, switching mechanism SW2 and output buffers OBs shown in FIG. 6 are realized with the outgoing modules OM1 to OMj. Further, according to the present invention, all of the N incoming lines necessary for the whole system are divided into j groups, each bundled for every n lines to make j bundles. For each n incoming lines, the hunt controlling portion HC is provided inside each of the incoming modules IM1 to IMj. By this constitution, the transmission capacity and the traffic amount can be easily increased simply by adding additional incoming and outgoing modules with simple wirings therebetween.

Each of the incoming modules IM1 to IMj has linking portions L1 to Lj (totally represented as L in FIG. 2). FIG. 3 is a block diagram illustrating the constitution of a part of the incoming module IMi in detail. As shown in FIG. 3, k ($k \neq n$) packet header processing circuits which are noncorresponding to the n incoming lines are provided in the hunt controlling portion HC, and all outputs of the k packet header processing circuits PH1 to PHk (totally represented as PH in FIG. 2) are transferred to each of the linking portions L1 to Lj. Each of the linking portions L1 to Lj includes first-in first-out (FIFO) memories F1 to Fk as buffers for storing packets from the respective packet header processing circuits PH1 to PHk, a FIFO memory RM for storing, in the sequence of the requested order, respective process requests of the data stored in the FIFO memories F1 to Fk, and a gate SD for transferring outputs of the FIFO memories F1 to Fk to the outgoing modules OM1 to OMj according to the specified process orders stored in the FIFO memory RM.

FIG. 4 is a block diagram illustrating the constitution of an outgoing module OMi in detail. In FIG. 4, each of the outgoing modules OM1 to OMj includes input buffers BF1 to BFj (totally represented as BF in FIG. 2) which are provided to be corresponding to all the incoming modules IM1 to IMj. Each input buffer BF distributes data packets to its outputs corresponding to outgoing line numbers. Each outgoing module OM further includes output buffers OB1 to OBn (totally represented as OB in FIG. 2) provided to be corresponding to the n outgoing lines of the outgoing module. Each output buffer OBi receives outputs of all the input buffers BF1 to BFj. Each outgoing module OM still further includes controlling portions CT1 to CTn (totally represented as CT in FIG. 2) associated with the output buffers OB1 to OBn respectively to control the output buffers OB1 to OBn in such a way that packets are transferred from the input buffers BF1 to BFj to the same outgoing line in the sequence of the transfer requests. Each of the output buffers OB1 to OBn includes a memory M1, an additional memory M2, and a gate switch GS. The gate switch GS transfers output packets from the input buffers BF1 to BFj to the memory M1 according to process instructing signals from the corresponding one of the controlling portions CT1 to CTn. Each output buffer further includes an output gate OG for transferring packets transmitted from the memory M1 to the memory M2 to the outgoing line according to the instructions from the corresponding one of the controlling portions CT1 to CTn.

Next, an operation of the embodiment of the present invention shown in FIGS. 2 to 4 will be described.

Figure 5:
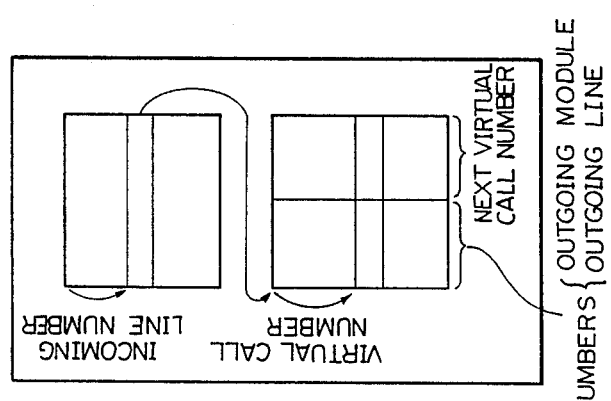
FIG. 5 is a view showing a conversion table of routing header information of the present invention.

In each of the incoming modules IM1 to IMj, when a data packet reaches the input buffer IB, the header information or, in other words, the virtual call number, of the packet is transferred to the controller CTL1. The controller CTL1 connects the input buffer in question to a free one of the packet header processing circuits PH and instructs the start of transferring the packet to the free packet header processing circuit PH. When the packet arrives at the packet header processing circuit PH, the header information of the packet is rewritten with a new virtual call number, and outgoing line number information and outgoing module number information are added to the virtual call number. Then, the packet is transferred to the linking portion L corresponding to the outgoing module having the number specified as above (FIG. 5). Subsequently, as soon as the transfer is completed, a free indication signal is transmitted from the free packet header processing circuit PH to the controller CTL1. In the linking portion L, when the packet arrives at one of the FIFO memories F1 to Fk corresponding to the packet header processing circuit PH, a FIFO number of the above-mentioned FIFO memory is set in the FIFO memory RM. The gate SD takes up packets from the FIFO memories F1 to Fk in the sequence set in the memory RM to send them to designated outgoing modules, and as a result, the transferring order of the packets are not disturbed.

When the packet arrives at designated one of the outgoing modules OM1 to OMj, the packet is stored in one of the input buffers BF1 to BFj, which are FIFO memories corresponding to the incoming modules, in the outgoing module in question. After that, the input buffer sends a transfer request to the controlling portion CT of the gate switch GS of one of the output buffers OB1 to OBn corresponding to the outgoing line designated by the outgoing line information previously added to the packet. At this time, the one of the controlling portions CT1 to CTn associated with the output buffer in question successively receives transfer requests from the respective input buffers BF1 to BFj, and the gate switch GS stores packets from the input buffers BF1 to BFj in the memory M1 or M2 in the order specified by the controlling portion CT. If the memory M1 or M2 is executing a transfer operation with respect to an outgoing line, a packet is transferred to the other memory M2 or M1. In this way, by preparing the two memories, a packet receiving operation and a packet transferring operation to an outgoing line can be simultaneously executed without internal blocking, thereby improving an activity efficiency of the outgoing lines. When a packet is transferred to an outgoing line, outgoing line information added thereto in the incoming module is erased.

As described above, the header driven type packet switching system according to the present invention is based on the technique that packets are transferred from incoming lines by hunting conventional packet header processing circuits arranged independently to the incoming lines. Required incoming and outgoing lines in total are divided into groups each being handled with incoming and an outgoing modules to cope with various traffic amounts from small to large sizes only by adding the same incoming and outgoing modules. A routing conversion table in each incoming module can be made smaller so that a memory capacity can be reduced. If the modules are connected to each other with lines having a transmission capacity corresponding to a transmission capacity of all the incoming lines, packets will not be abandoned between the incoming and outgoing modules due to a buffer busy state.

We claim:

1. A header driven type packet switching system for switching from N incoming lines to N outgoing lines, comprising:
   j incoming modules (IM1 to IMj) each accommodating a group of n incoming lines which are derived from said N incoming lines by dividing said N incoming lines into j groups;
   j outgoing modules (OM1 to OMj) each being connected to said j incoming modules through transfer lines, each of said j outgoing modules being connected to n outgoing lines which are derived from said N outgoing lines by dividing said N outgoing lines into j groups;
   each of said j incoming modules (IM1 to IMj) comprising:
   a plurality of packet header processing circuits (PH1 to PHk) disposed independently of said n incoming lines, for rewriting outgoing line information, outgoing module information and header information in the header of the incoming packet;
   a hunt control portion (HC) for hunting a free circuit from among said packet header processing circuits; and
   linking portion (L1 to Lj) disposed to be corresponding to all of said outgoing modules (OM1 to OMj), for transferring packets from said hunt controlling portion (HC) to the corresponding outgoing modules in the sequence of transfer requests.

2. A header driven type packet switching system as claimed in claim 1, wherein said transfer lines between one of said j incoming modules and said j outgoing modules have a transmission capacity equal to a transmission capacity of the n incoming lines of said one of said j incoming modules.

3. A header driven type packet switching system as claimed in claim 1 wherein each of said outgoing modules (OM1 to OMj) comprises:
   j input buffer (BF1 to BFj) respectively connected to the outputs of said incoming modules, each for distributing data packets transferred from said incoming modules to n outputs in accordance with said outgoing line information in the received data packet;
   n output buffers (OB1 to OBn) each having j inputs respectively connected to the outputs of said j input buffers and having an output connected to one of n outgoing lines; and
   controlling portions (CT1 to CTn) associated with said output buffers (OB1 to OBn) respectively to control said output buffers (OB1 to OBn) such that packets are transferred from said input buffers through each of said output buffers to the same outgoing line in the order of transfer request.

4. A header driven type packet switching system as claimed in claim 2, wherein each of said outgoing modules (OM1 to OMj) comprises:
   j input buffer (BF1 to BFj) respectively connected to the outputs of said incoming modules, each for distributing data packets transferred from said incoming modules to n outputs in accordance with said outgoing line information in the received data packet;
   n output buffers (OB1 to OBn) each having j inputs respectively connected to the outputs of said j input buffers and having an output connected to one of n outgoing lines; and
   controlling portions (CT1 to CTn) associated with said output buffers (OB1 to OBn) respectively to control said output buffers (OB1 to OBn) such that packets are transferred from said input buffers through each of said output buffers to the same outgoing line in the order of transfer request.

* * * * *

UNITED STATES PATENT AND TRADEMARK OFFICE
CERTIFICATE OF CORRECTION

PATENT NO. : 4,837,761

DATED : June 6, 1989

INVENTOR(S) : Osamu ISONO et al.

It is certified that error appears in the above-identified patent and that said Letters Patent is hereby corrected as shown below:

```
Col. 1,   line 66, after "lines" insert --)--;
          line 32, after "ing" insert --system--.
Col. 7,   line 8, change "are" to --is--;
          line 9, after "at" insert --a--;
          line 43, delete "an";
          line 47, change "a" to --the--;
          line 49, change "a" to --the--(second
                   occurrence).
Col. 8,   line 27, after "claim 1" insert --,--.
```

Signed and Sealed this

Tenth Day of July, 1990

Attest:

HARRY F. MANBECK, JR.

*Attesting Officer*      Commissioner of Patents and Trademarks